Dec. 22, 1942.  P. W. LANGE ET AL  2,305,624
POWER DRIVEN PIPE TONGS
Filed April 22, 1939   2 Sheets-Sheet 2
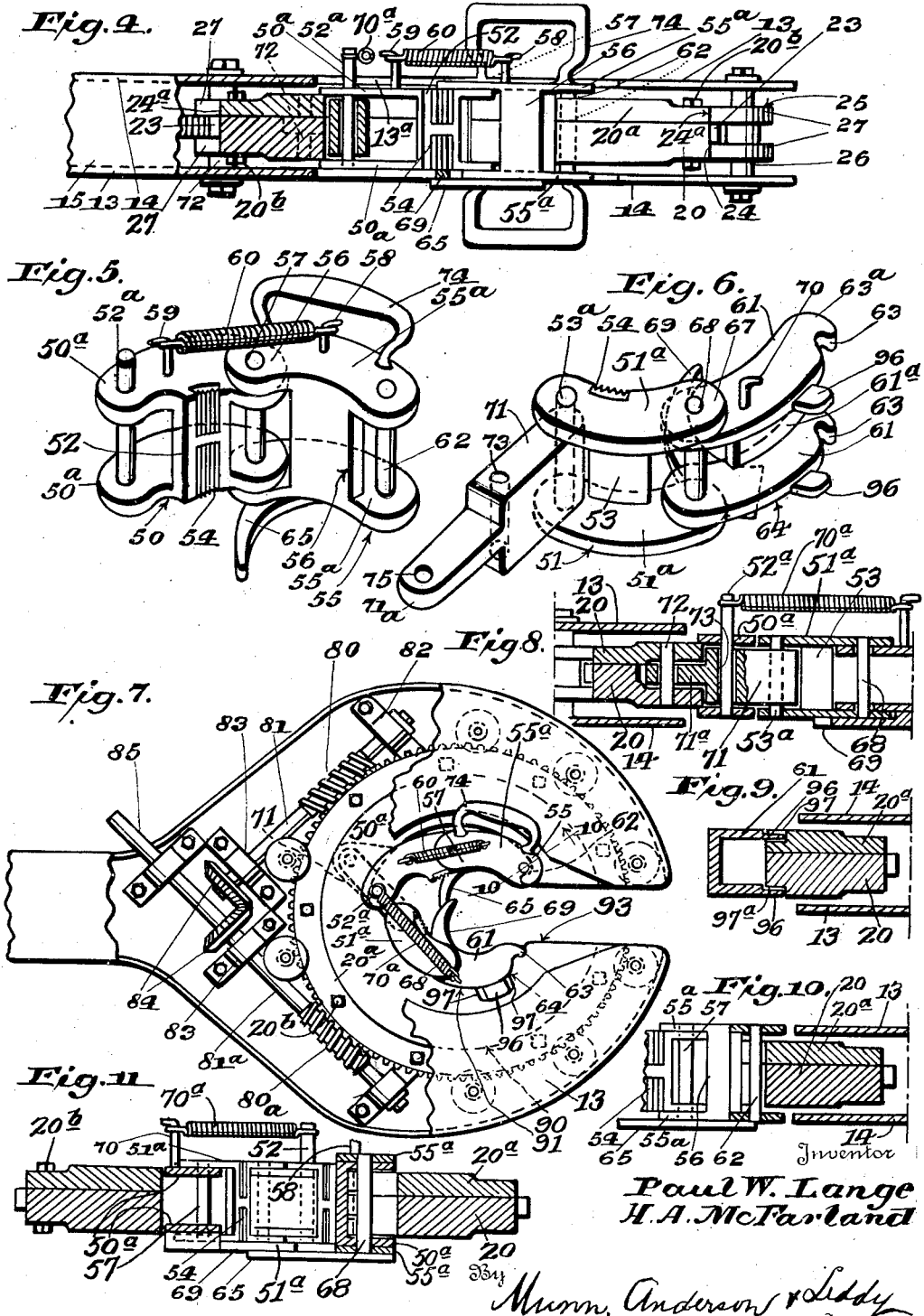

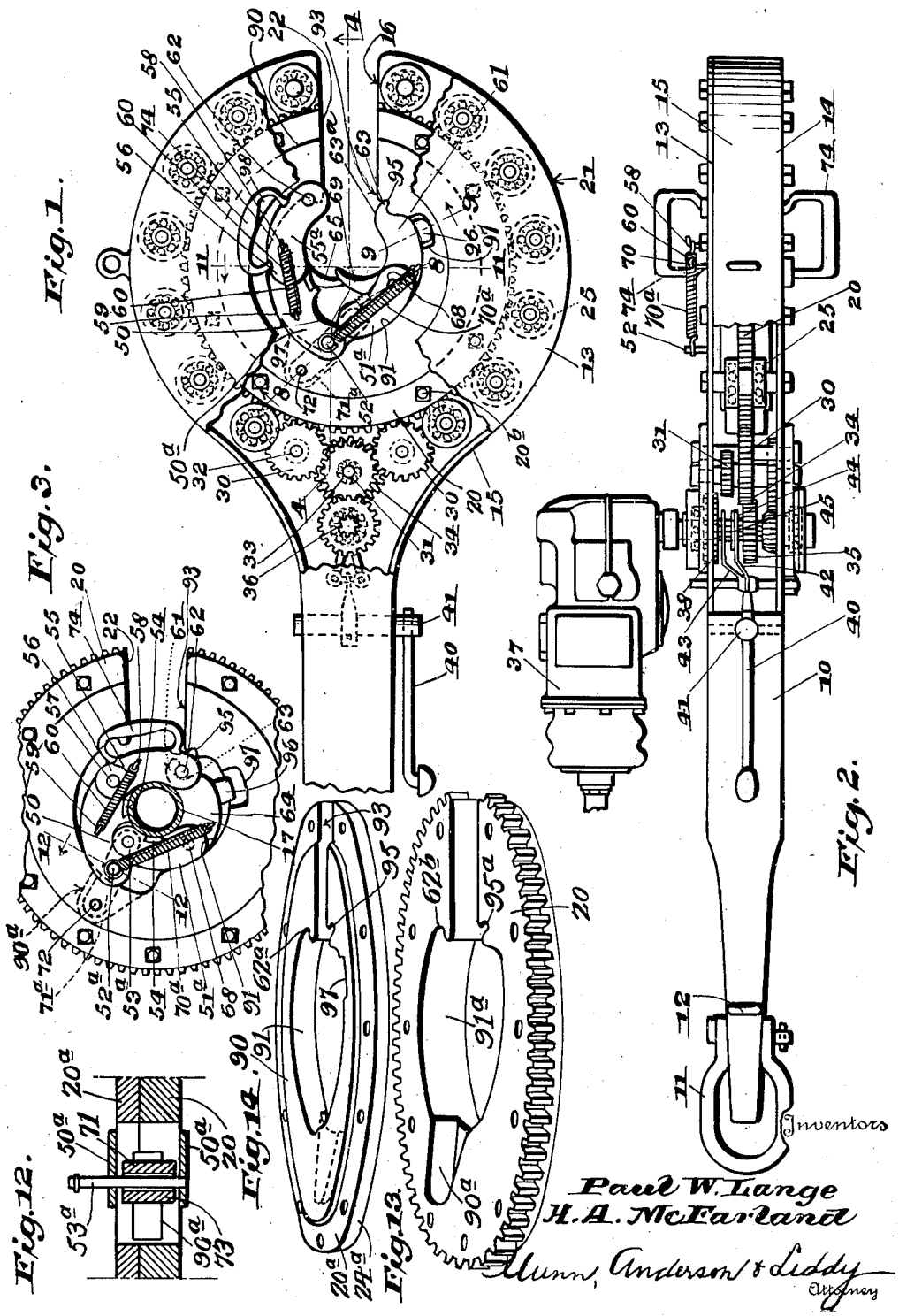

Patented Dec. 22, 1942

2,305,624

UNITED STATES PATENT OFFICE 2,305,624

POWER DRIVEN PIPE TONGS

Paul W. Lange and Harold A. McFarland, Casper, Wyo.

Application April 22, 1939, Serial No. 269,527

6 Claims. (Cl. 81—57)

This invention relates to power-driven pipe tongs.

An object of the invention is the provision of power-driven pipe tongs in which triggers are adapted to trip a pair of jaws for moving the jaws in connection with a pair of other jaws in operative relation with a pipe with springs normally in a dead center position for causing the jaws to tighten around the pipe after the first-mentioned jaws have been tripped and after the springs have moved off the dead center so that there is no danger of the jaws becoming loose as soon as the torque on the jaws has become lessened.

Another object of the invention is the provision of power driven tongs in which springs are adapted to immediately come into action after a tripping mechanism has set the jaws in motion for gripping a pipe whereby these springs will take up any slack in the jaws and impart a firm and constant grip on the pipe at varying speeds regardless of the pressure applied.

A further object of the invention is the provision of power driven pipe tongs in which the jaws are automatically tripped to move into operative relation with a pipe while springs set in motion by the tripping action maintains the jaws in firm gripping relation with a pipe at varying speeds and pressures, the jaws being released when sufficient force is applied to overcome the tension of the springs and a pin which locks a pair of the outer jaws together, the jaws being revolved by a supporting ring gear which is mounted in a plurality of pairs of ball bearings which straddle the ring gear.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a side view of the power-driven tongs with part of the casing broken away.

Figure 2 is a top plan view of the tongs with parts of the casing broken away,

Figure 3 is a fragmentary side view of the gripping elements embodied in a ring gear with parts broken away to show the gripping elements, Figure 4 is a horizontal section taken along the line 4—4 of Fig. 1, Figure 5 is a view in perspective of a cooperating tripping element and jaws, Figure 6 is a view in perspective of cooperating jaws and a tripping element associated with the jaws shown in Fig. 5, Figure 7 is a side view in elevation of a modified form of the power driven pipe tongs with parts broken away, Figure 8 is a transverse section taken along the line 8—8 of Fig. 1, and Figure 9 is a transverse section taken along the line 9—9 of Fig. 1, Figure 10 is a transverse section taken along the lines 10—10 of Figure 7, Figure 11 is a transverse section taken along the lines 11—11 of Figure 1, Figure 12 is a transverse section taken along the lines 12—12 of Figure 3, Figures 13 and 14 are perspective views of the ring gear and plate therefor, respectively.

Referring more particularly to Fig. 2 it will be seen that a handle 10 is provided with a swingable bail 11 at its free end adapted to be engaged by a hook for retaining the handle in a predetermined position when the tongs are operated. A hook 12 is secured to the handle 10 in any approved manner and is adapted to be engaged by a suitable arrangement (not shown) for supporting the tongs as desired.

The outer end of the handle is expanded and is provided with a front plate 13 and a rear plate 14 and these plates are connected along their peripheries to a wall 15 to form a housing for the power driven pipe tongs and these plates are made sufficiently strong to stand the pressure which is adapted to be applied for rotating heavy pipes. Each of these plates is provided with a radial opening 16 through which the pipe 17 is inserted.

A ring gear 20 is rotatably mounted within the housing, generally designated by the numeral 21, which is formed of the plates 13, 14 and 15. This ring gear is provided with cut-away portion, as shown at 22, in Fig. 1, and this cut-away portion forms a slot which aligns with the opening 16 in the housing 21. The ring gear is made sufficiently strong to withstand the pressures during the operation of the tool. As shown more particularly in Figs. 1, 2 and 4, the ring gear has teeth 23 located centrally thereof with a bearing surface 24 at one side of the teeth. A plate 20ª is secured at spaced points to the ring gear by bolts 20ᵇ and has an annular bearing surface 24ª.

A plurality of roller bearings, generally designated by the numeral 25, are mounted on shafts 26 carried by the plates 13 and 14. These bearings straddle the teeth 23 of the ring gear 20 while rollers 27 engage the bearing surfaces 24 and 24ᵃ at opposite sides of the teeth. These bearings are spaced at predetermined points around the periphery of the ring gear, as shown in Fig. 1.

A pair of gears 30 meshing with the ring gear 20 are located upon opposite sides of a gear 31, adjacent the bottom of the housing 21 where the housing joins the handle 10. The gears 30 are revolved by the gear 31 and they also mesh with the ring gear 20 for revolving said ring gear. Due to the fact that the ring gear is provided with an opening at 22 one of the gears 30 will always mesh with the ring gear when the opening 22 passes one of the gears 30 so that the ring gear will be constantly revolved. The gears 30 are mounted upon shafts 32 which are carried by the housing 21.

The gear 31 is rigidly connected with a shaft 33 which is mounted for rotation in the housing 21. A second gear 34 is also rigidly connected to said shaft, as shown more particularly in Figs. 1 and 2.

A gear 35 is slidably keyed upon a shaft 36 rotatably mounted in the housing below the shaft 33 and the shaft 36 is driven in any approved manner by a motor, generally designated by the numeral 37. This motor may be electrically driven or it may be operated by compressed air or by any of the well known fluids for the purpose. A second gear 38 is also slidably keyed to the shaft 36 and is adapted to be moved into mesh with the gear 31 when the gear 35 has been moved out of mesh with the gear 34.

A gear shifting lever 40 is connected to a rock shaft 41 and is located exteriorly of the handle 10. This rock shaft is provided with a pair of yokes 42 and 43 which are respectively received by grooves 44 and 45 formed in the hubs of the respective gears 35 and 38. Thus it will be seen that the gears 35 and 38 may be shifted into and out of mesh with the respective gears 34 and 31 for changing the speed of the shaft 33 and likewise the gears 30.

Gripping jaws 50 and 51 are each formed of a pair of spaced plates 50ᵃ and 51ᵃ respectively. Plates 50ᵃ are connected together by a bridging bar 52 while plates 51ᵃ are connected together by a bar 53. A pin 52ᵃ is carried by the plates 50ᵃ and projects through an opening 13ᵃ in the wall 13 of the housing 21.

The jaws 50 and 51 are provided with a toothed plate 54 located within a groove at the inner face of the respective bars 52 and 53 and these plates are replaceable after they have been worn. These toothed plates are adapted to bite into the pipe for rigidly holding the plate against rotation within the jaws.

An auxiliary or interlocking jaw 55 is formed of spaced plates 55ᵃ which are connected together by a bar 56 and pivotally mounted upon a pin 57 carried by the free ends of the plates 50ᵃ. Lugs 58 and 59 project laterally from the respective plates 50ᵃ and 51ᵃ of the jaws 50 and 55 and are connected by a coil spring 60 for a purpose which will be presently explained.

The outer free end of the auxiliary jaw 55 is provided with a pin 62 adapted to be engaged by lips 63 on plates 61 of an auxiliary or interlocking jaw 64 pivotally connected to the plates 51ᵃ of the jaw 51. A curved trip finger 65 is connected to the auxiliary jaw 55 for a purpose which will be presently explained. A bar 61ᵃ connects the plates 61 together.

The auxiliary jaw 64 is received between the outer ends of the plates 51ᵃ and is pivotally mounted on a pin 68. A curved trip finger 69 is rigidly secured to one plate of the auxiliary jaw 64. The other plate of this jaw is provided with a laterally projecting lug 70 for a purpose which will be presently explained.

A lever 71 has one end connected to a pin 53ᵃ as shown in Fig. 6 and has a passage 73 which receives the pin 52 of the jaw 50. The reduced end 71ᵃ of the lever is pivotally connected to a pin 72 carried by the ring gear 20, and the plate 20ᵃ as shown in Figs. 4, 7 and 8. The reduced portion 71ᵃ has an opening 75 to receive the pin 72'. It will be noted from Figs. 3, 12, 13 and 14 that the gear 20 and plate 20ᵃ are cut away to form a pocket to house the end 71ᵃ of the lever 71.

A coil spring 70ᵃ has one end connected to the lug 70 while the other end is connected to the pin 52ᵃ.

Handles 74 are connected to the auxiliary jaw 55 and are adapted when pulled outwardly with sufficient force to release the auxiliary jaws 55, 64 and the main jaws 50 and 51 for disengaging the pipe from the power driven tongs.

Referring more particularly to Fig. 7 it will be seen that instead of gears 30 (Fig. 1) a pair of worms 80 and 80ᵃ are formed on shafts 81 and 81ᵃ, respectively, and these shafts are mounted in bearings 82 and 83. These shafts are located at substantially right angles to each other and have their inner ends provided with intermeshing gears 84. The worms 80 and 80ᵃ mesh with the ring gear 20.

The shaft 81ᵃ is provided with an extension 85 which is adapted to be connected to a transmission mechanism driven by any suitable power as shown at 37 and previously described. By the use of the worm gears 80 and 80ᵃ instead of the gears 30 the ring gear 20 is thus made irreversible and is adapted to be used in connection with tongs for heavy duty where other power is applied to turn the handle 10 of the tongs for screwing pipes which have been tightened too rigidly to be turned by the regular power applied to the shaft 85.

The operation of the tongs is as follows: When a pipe is inserted into the open slot 16 it will first engage the curved trip 69 and thus move the trip inwardly. When this happens the auxiliary jaw 64 is moved inwardly in embracing relation with the pipe. The trip 65 is subsequently engaged directly after the engagement of the trip 69 and since the trip 65 is rigidly connected with the auxiliary jaw 55 this jaw will also be moved inwardly and the lips 63 will engage the pin 62 on the auxiliary jaw 55. Since the jaw 64 is moved in advance of the movement of the jaw 55 the lips 63 will be positioned inwardly of the pin 62 so that said lips will be adapted to receive the pin 62 when the cam surfaces 63ᵃ at the outer end of the jaw 64 move over the pin 62.

When the jaws 55 and 64 are tilted inwardly, the springs 60 and 70ᵃ which have been on a dead center line (Fig. 1) while the jaws are in an inoperative position, are thrown off dead center as shown in Fig. 3, thereby pulling all of the jaws into gripping relation with the pipe 17 so that the teeth 54 will be in a position to rigidly hold the pipe against rotation and these springs prevent slippage of the pipe during changes in speed of the ring gear 20 and likewise during changes in pressure exerted on the pipe.

When the springs 60 and 70ᵃ shift their positions from that shown in Fig. 3, the jaws 60 and 51 are not only pulled into operative relation with the pipe 17 but the lever 71 is also shifted from its vertical alignment with the pins 52ª, 53ª and 68 whereby the lever will be disposed at an angle to a line drawn through the pins 53ª and 68 and the rotation of the ring gear 20 will exert a pull on the lever 71 and maintain the jaws in rigid gripping relation with the pipe.

After the rotation of the pipe has been completed the motor 37 is stopped and the handles 74 may be actuated for releasing the jaws 55 and 64 from their positions around the pipe whereby the jaws 50 and 51 will be moved to an inoperative position and the springs 60 and 70ª will likewise be again moved to their dead center positions as shown in Fig. 1. The tongs may then be withdrawn from the pipe.

The ring or plate 20ª is provided with a boss 90 having an opening 91 which alines with a similar opening 91ª in the ring gear 20. The plate is secured to the ring gear by means of bolts 92 so that the plate and gear will be revolved as a unit. The plate and gear having cut out portions to form a pocket 90ª to receive the end 71ª of the lever 71.

The ring 20ª and boss 90, as shown in Figs. 1, 3 and 7 is provided with an opening 93 which aligns with the openings or slots 16 and 22 through which the pipe 17 is adapted to be inserted to be received by the jaws of the tongs. It will also be noted that the outer curved faces of the bars 52, 56, 53 and 61ª of the jaws when in an inoperative position are adapted to engage the curved walls at the periphery of the central openings in the plate 20ª and the gear 20. Said plate and gear are provided with the respective notches 95 and 95ª (Figs. 13, 14) to receive the fingers 63 on the jaw 64 and for retaining the jaw in an inoperative position. The plate and gear are also provided with the respective notches 63ª and 62ᵇ to receive the pin 62 when the jaw 55 is held in an inoperative position by the spring 60.

The plate 61 of the interlocking jaw 64 has projecting lugs 96 adapted to be received within slots 97 and 97ª formed respectively in the plate 20ª and ring gear 20 to prevent lateral slippage of said jaw when it is shifted within the housing 21, as shown more particularly in Figs. 1, 7 and 9. A side face of the jaw 51 is adapted to engage a side wall of the plate 20ª for preventing lateral shifting movement between the jaw 50 and said plate. The interlocking jaw 55 also has one face (Figs. 1, 3 and 7) in engagement with a side wall of the plate 20ª for preventing relative movements between the jaw 55 and the plate.

The triggers 65 and 69 merely trip the interlocking jaws 55 and 64 towards each other while the springs 60 and 70ª tighten the jaws around the pipe. The tongs are then given a slight reverse pull away from the pipe and the spring 70ª which has a dual action, rolls the jaw assembly around to grip the pipe in rigid relation so that when either the gear 20 or the plate 20ª are revolved the jaws will hold the pipe against slippage.

We claim:

1. A power driven tongs comprising a housing, bearings in the housing, a ring gear provided with an annular shoulder rotatably mounted on the bearings, a reinforcing plate having a central opening in line with the inner periphery of the ring gear and secured to one face of the gear, the periphery of said plate being supported by the bearings, the gear and plate having a radially disposed pipe entrance opening leading into the central opening in the plate and gear, the plate and gear being provided with a pocket opposite the entrance opening, a lever having one end pivoted within the pocket, the other end projecting into the central opening, a jaw having one end pivoted to the inner end of the lever, a second jaw pivoted at one end to an intermediate portion of the lever, a third jaw pivoted to the free end of the first jaw at one side of the entrance opening, a fourth jaw pivoted to the free end of the second jaw at the other side of the entrance opening, all of the jaws riding on the inner peripheries of the plate and gear, means for causing the jaws to cooperatively clamp around a pipe when said pipe is moved into the central opening, and means rotating the gear and plate.

2. A power driven tongs comprising a housing, bearings in the housing, a ring gear provided with an annular shoulder rotatably mounted on the bearings, a reinforcing plate having a central opening in line with the inner periphery of the ring gear and secured to one face of the gear, the periphery of said plate being supported by the bearings, the gear and plate having a radially disposed pipe entrance opening leading into the central opening in the plate and gear, the plate and gear being provided with a pocket opposite the entrance opening, a lever having one end pivoted within the pocket, the other end projecting into the central opening, a jaw having one end pivoted to the inner end of the lever, a second jaw pivoted at one end to an intermediate portion of the lever, a third jaw pivoted to the free end of the first jaw at one side of the entrance opening, a fourth jaw pivoted to the free end of the second jaw at the other side of the entrance opening, all of the jaws riding on the inner peripheries of the plate and gear, means for causing the jaws to cooperatively clamp around a pipe when said pipe is moved into the central opening, means rotating the gear and plate, the second jaw having a cut-out portion, said lever when rocked causing one end of the first jaw to be moved into the cut-out portion of the second jaw.

3. A power driven tongs comprising a housing, bearings in the housing, a ring gear provided with an annular shoulder rotatably mounted on the bearings, a reinforcing plate having a central opening in line with the inner periphery of the ring gear and secured to one face of the gear, the periphery of said plate being supported by the bearings, the gear and plate having a radially disposed pipe entrance opening leading into the central opening in the plate and gear, the plate and gear being provided with a pocket opposite the entrance opening, a lever having one end pivoted within the pocket, the other end projecting into the central opening, a jaw having one end pivoted to the inner end of the lever, a second jaw pivoted at one end to an intermediate portion of the lever, a third jaw pivoted to the free ends of the first jaw at one side of the entrance opening, a fourth jaw pivoted to the free end of the second jaw at the other side of the entrance opening, all of the jaws riding on the inner peripheries of the plate and gear, means for causing the jaws to cooperatively clamp around a pipe when said pipe is moved into the central opening, means rotating the gear and plate, said jaws being provided with flanges cooperatively engaging the outer faces of the plate and gear for guiding and maintaining the jaws in alignment when moved around the pipe.

4. A power driven tongs comprising a housing, a ring gear rotatably confined in the housing, said ring gear and housing having a central opening and a radial slot leading into the central opening, said gear being provided with a pocket, a lever having one end pivotally mounted in the pocket of the ring gear, a pair of clamping jaws located within the central opening of the ring gear and slidably mounted on the periphery of the central opening in the gear, one of the jaws having a pivotal connection with the other end of the lever, the second jaw having pivotal connection with the lever intermediate the ends thereof, operating means on the ends of the jaws for removably connecting the ends of the jaws together around a pipe which has been inserted through the radial slot and received by the central opening in the gear and housing, means for causing rotation of the gear and rocking of the lever so that the pivoted ends of the jaws will be forced toward each other by the movement of the lever for causing said jaws to bind around the pipe and for causing rotation of the pipe, and means for maintaining the housing against rotation.

5. A power driven tongs comprising a housing, a ring gear rotatably confined in the housing, said ring gear and housing having a central opening and a radial slot leading into the central opening, said gear being provided with a pocket, a lever having one end pivotally mounted in the pocket of the ring gear, a pair of clamping jaws located within the central opening of the ring gear and slidably mounted on the periphery of the central opening in the gear, one of the jaws having a pivotal connection with the other end of the lever, the second jaw having pivotal connection with the lever intermediate the ends thereof, operating means on the ends of the jaws for removably connecting the ends of the jaws together around a pipe which has been inserted through the radial slot and received by the central opening in the gear and housing, means for causing rotation of the gear and rocking of the lever so that the pivoted ends of the jaws will be forced toward each other by the movement of the lever for causing said jaws to bind around the pipe and for causing rotation of the pipe, a plurality of rollers mounted on the housing and straddling the teeth of the gear for rotatably supporting said gear in the housing, and means for maintaining the housing against rotation.

6. A power driven tongs comprising a housing, a ring gear rotatably confined in the housing, a reinforcing plate secured to one face of the gear, said ring gear plate and housing having a central opening and a radial slot leading into the central opening, said gear being provided with a pocket, a lever having one end pivotally mounted in the pocket of the ring gear, a pair of clamping jaws located within the central opening of the ring gear and slidably mounted on the peripheries of the plate and housing, one of the jaws having a pivotal connection with the other end of the lever, the second jaw having pivotal connection with the lever intermediate the ends thereof, operating means on the ends of the jaws for removably connecting the ends of the jaws together around a pipe which has been inserted through the radial slot and received by the central opening in the gear and oscillation of the lever so that the pivoted ends of the jaws will be forced toward each other by the movement of the lever for causing said jaws to bind around the pipe and for causing rotation of the pipe, and means for maintaining the housing against rotation, said jaws having depending flanges engaging the outer walls of the reinforcing plate and gear.

PAUL W. LANGE.
HAROLD A. McFARLAND.